US009100130B2

(12) United States Patent
Hirth et al.

(10) Patent No.: US 9,100,130 B2
(45) Date of Patent: *Aug. 4, 2015

(54) BURST MODE TO CONTINUOUS MODE CONVERTER

(71) Applicant: Broadcom Corporation, Irvine, CA (US)

(72) Inventors: Ryan E. Hirth, Windsor, CA (US); Jaroslaw Wojtowicz, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,085

(22) Filed: Oct. 17, 2013

(65) Prior Publication Data
US 2014/0044441 A1  Feb. 13, 2014

Related U.S. Application Data

(63) Continuation of application No. 12/967,799, filed on Dec. 14, 2010, now Pat. No. 8,565,605.

(60) Provisional application No. 61/286,705, filed on Dec. 15, 2009.

(51) Int. Cl.
*H04B 10/00*   (2013.01)
*H04B 10/69*   (2013.01)
(Continued)

(52) U.S. Cl.
CPC .............. *H04B 10/69* (2013.01); *H04J 3/1694* (2013.01); *H04J 14/08* (2013.01); *H04J 3/0682* (2013.01)

(58) Field of Classification Search
CPC ... H04J 14/02; H04J 14/0242; H04J 14/0278; H04J 3/0682; H04J 3/1694; H04J 14/08
USPC .......... 398/58, 67, 68, 70–72, 154, 155, 158, 398/159, 175, 176
See application file for complete search history.

(56) References Cited

U.S. PATENT DOCUMENTS 6,493,335 B1   12/2002   Darcie et al.
8,578,222 B2 *  11/2013   Chun et al. ................. 714/708
(Continued)

FOREIGN PATENT DOCUMENTS

CN   1307409 A   8/2001
CN   1453944 A   11/2003

OTHER PUBLICATIONS

Office Action for related Chinese Patent Application No. 2010105896703, mailed May 6, 2013; 6 pages.
(Continued)

*Primary Examiner* — Dalzid Singh
(74) *Attorney, Agent, or Firm* — Sterne, Kessler, Goldstein & Fox

(57) ABSTRACT

A system to convert upstream burst mode data into continuous mode data in a passive optical network (PON) is provided herein. The system includes a burst mode Serializer/Deserializer (SerDes) that recovers a clock and burst mode data from an Optical Network Unit (ONU). The burst mode unit recovers the burst mode data based on a start time of burst mode data transmission by the ONU and a round-trip time between the ONU and an Optical Line Terminal (OLT). The system further includes a continuous mode SerDes that is coupled to the burst mode SerDes. The continuous mode SerDes is configured to receive the recovered clock and recovered burst mode data from the burst mode SerDes and convert the burst mode data into continuous mode data by buffering and padding the burst mode data based on the recovered clock. The continuous mode Serdes is configured to transmit the continuous mode data to the OLT.

20 Claims, 12 Drawing Sheets

Figure 4A:
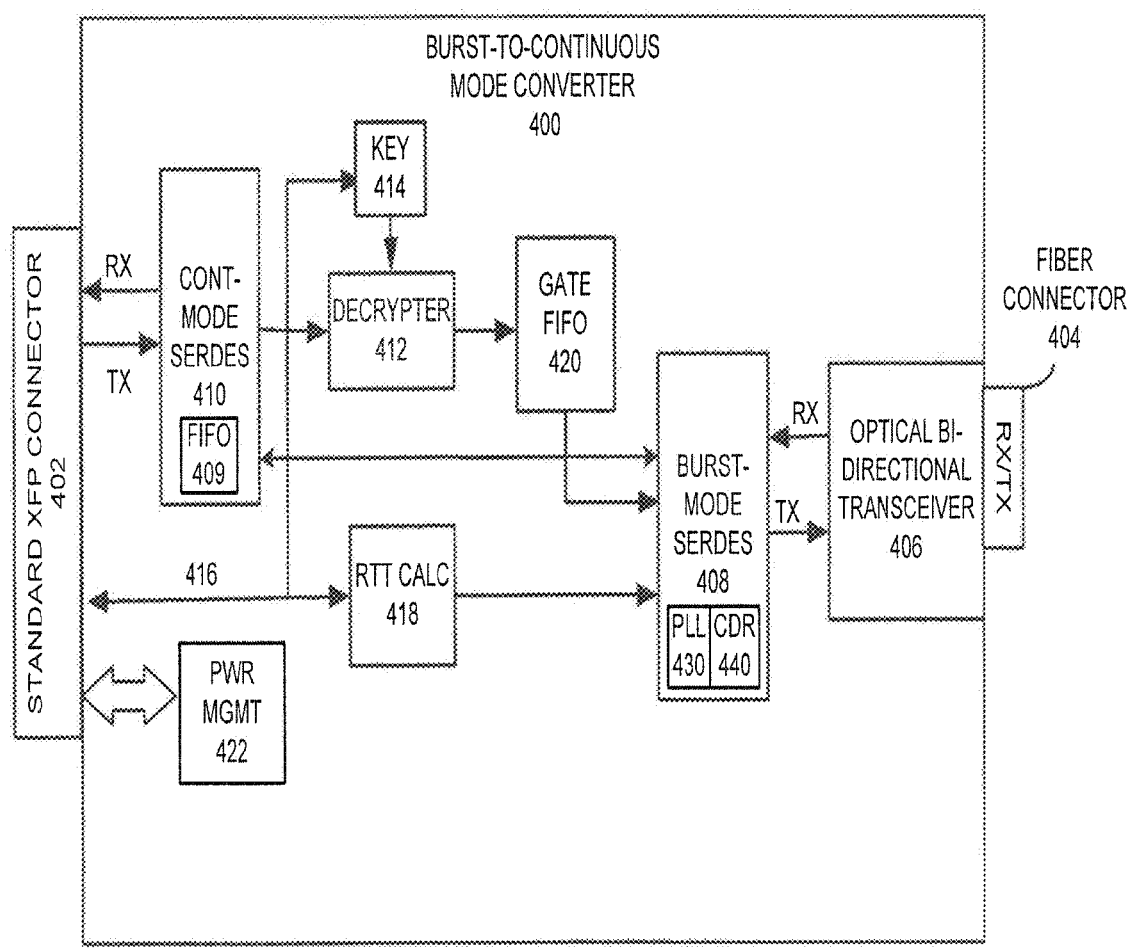

(51) Int. Cl.
*H04J 3/16* (2006.01)
*H04J 14/08* (2006.01)
*H04J 3/06* (2006.01)

(56) References Cited

U.S. PATENT DOCUMENTS

| | | | |
|---|---|---|---|
| 2003/0179771 A1* | 9/2003 | Chan et al. | 370/445 |
| 2006/0133809 A1* | 6/2006 | Chow et al. | 398/66 |
| 2008/0166124 A1* | 7/2008 | Soto et al. | 398/63 |
| 2009/0279597 A1 | 11/2009 | Bereza et al. | |
| 2011/0013904 A1 | 1/2011 | Khermosh et al. | |
| 2011/0142443 A1 | 6/2011 | Hirth et al. | |

OTHER PUBLICATIONS

Office Action for related Taiwanese Patent Application No. 099144108, mailed Nov. 13, 2013; 6 pages.

Tagami, et al., "A Burst-Mode Bit-Synchronization IC With Large Tolerance for Pulse-Width Distortion for Gigabit Ethernet PON," IEEE Journal of Solid-State Circuits, vol. 41, No. 11, Nov. 2006; 11 pages.

English-Language Abstract of Chinese Patent Publication No. 1307409 A; 1 page.

English-language Abstract of Chinese Patent Publicatin No. 1453944 A; 1 page.

* cited by examiner

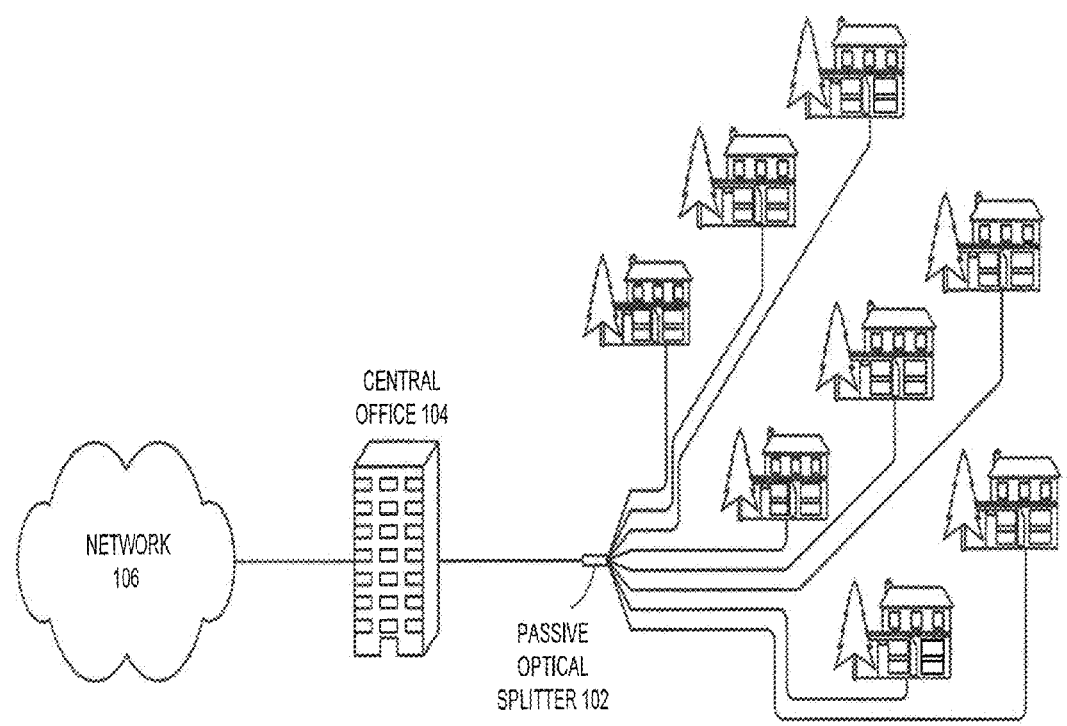
FIG. 1
(Conventional)

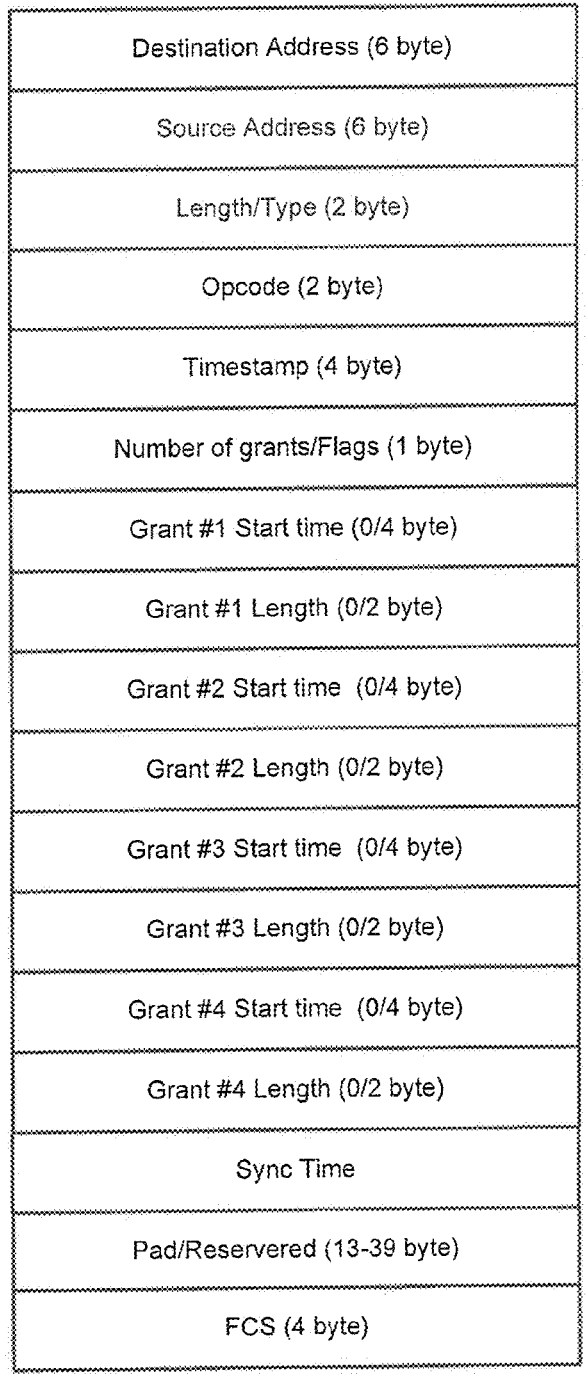
FIG. 2
(Conventional)

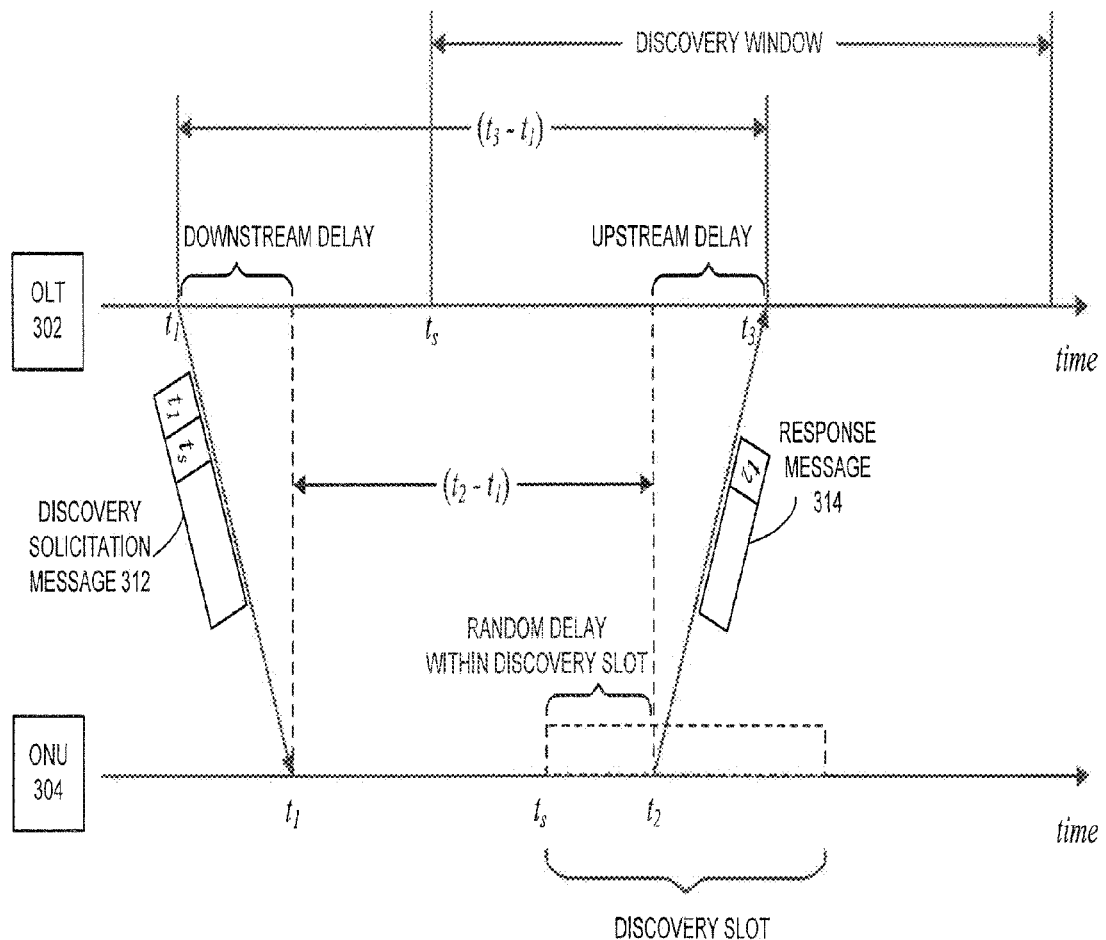
FIG. 3
(Conventional)

BURST MODE TO CONTINUOUS MODE CONVERTER

CROSS REFERENCE TO RELATED APPLICATIONS

This application is a continuation of U.S. patent application Ser. No. 12/967,799, filed on Dec. 14, 2010, which claims the benefit of U.S. Provisional Application No. 61/286,705 filed Dec. 15, 2009, both of which are incorporated herein by reference in their entirety.

BACKGROUND OF THE INVENTION

1. Field of the Invention

The present invention relates to an Ethernet Passive Optical Network (EPON). More specifically, the present invention relates to a burst mode to continuous mode converter used in an EPON.

2. Background Art

In conventional Ethernet Passive Optical Networks, an Optical Line Terminal (OLT) transmits data downstream to multiple Optical Network Units (ONUs) in continuous mode. "Continuous mode" as referred to herein refers to continuous transmission of data. Data received in a continuous mode is referred to as "continuous mode data" herein. However, the ONUs transmit data "upstream" to OLTs in burst mode. "Burst mode" as referred to herein refers to data transfer in short periodic or non-periodic bursts. Data received in burst mode is referred to as "burst mode data" herein. The use of a burst mode for transmissions to the OLT results in constant charging and discharging of Alternating Current (AC) coupling capacitors at the OLT. The constant charging and discharging may result in time delays in the data stream. Furthermore, it is highly challenging to have a burst mode Serializer/Deserializer (SerDes) operating at a high speed, such as 10 GHz as required by a 10 GHz EPON because of the constant charging and discharging of AC coupling capacitors. Currently available burst mode SerDes designs often operate at a speed of 1.25 GHz.

Methods and systems are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 presents a diagram illustrating an EPON wherein a central office and a number of subscribers are coupled through optical fibers and a passive optical splitter.

FIG. 2 presents a diagram illustrating the format of a GATE message according to IEEE standard 802.3ah.

FIG. 3 presents a time-space diagram illustrating the discovery process.

FIG. 4A presents a diagram illustrating an exemplary pluggable burst-to-continuous mode converter module proximate to an OLT in accordance with an embodiment of the present invention.

Figure 4B:
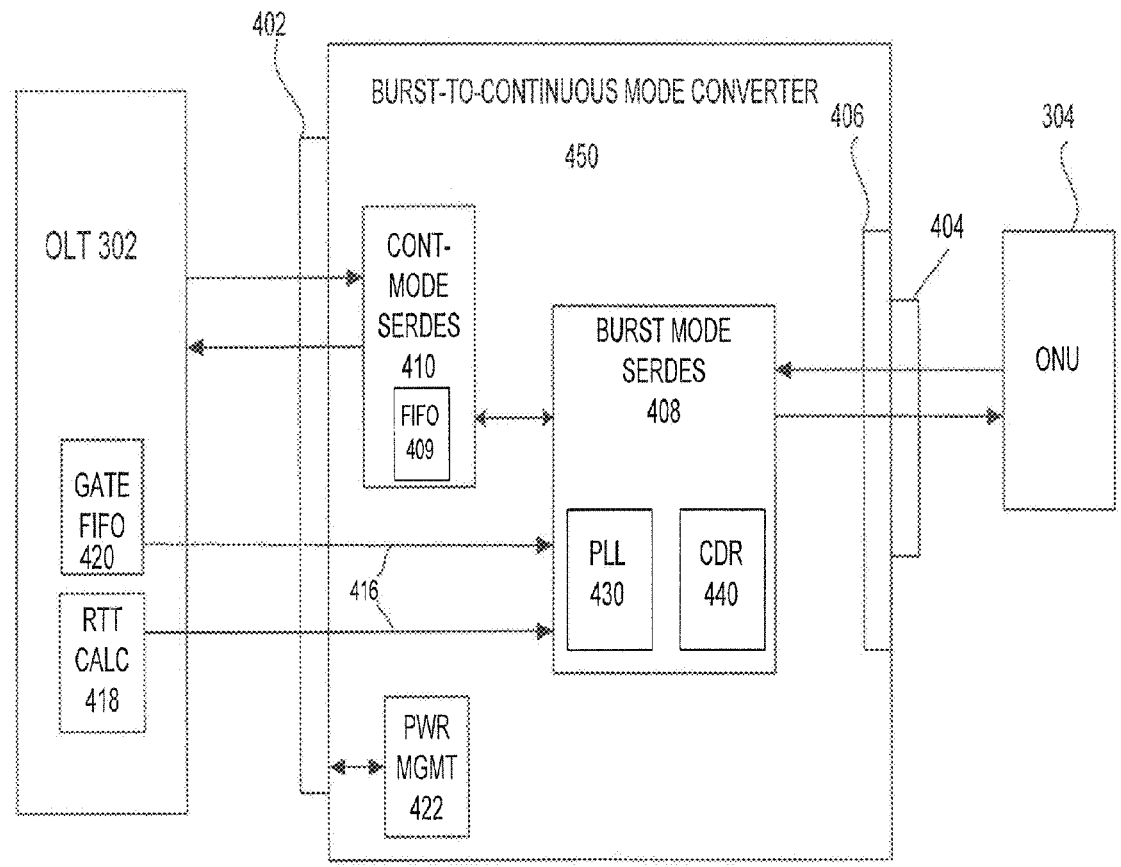

FIG. 4B presents a diagram illustrating an alternate pluggable burst-to-continuous mode converter module proximate to an OLT in accordance with an embodiment of the present invention.

Figure 5A:
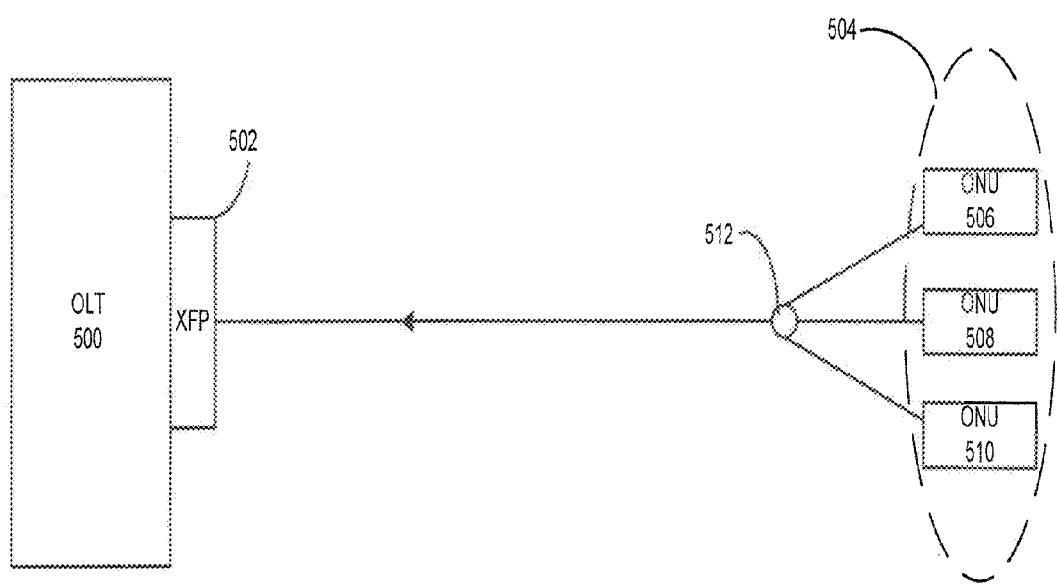

FIG. 5A presents a diagram illustrating an exemplary EPON architecture with burst-to-continuous mode converter plugged into an OLT in accordance with an embodiment of the present invention.

Figure 5B:
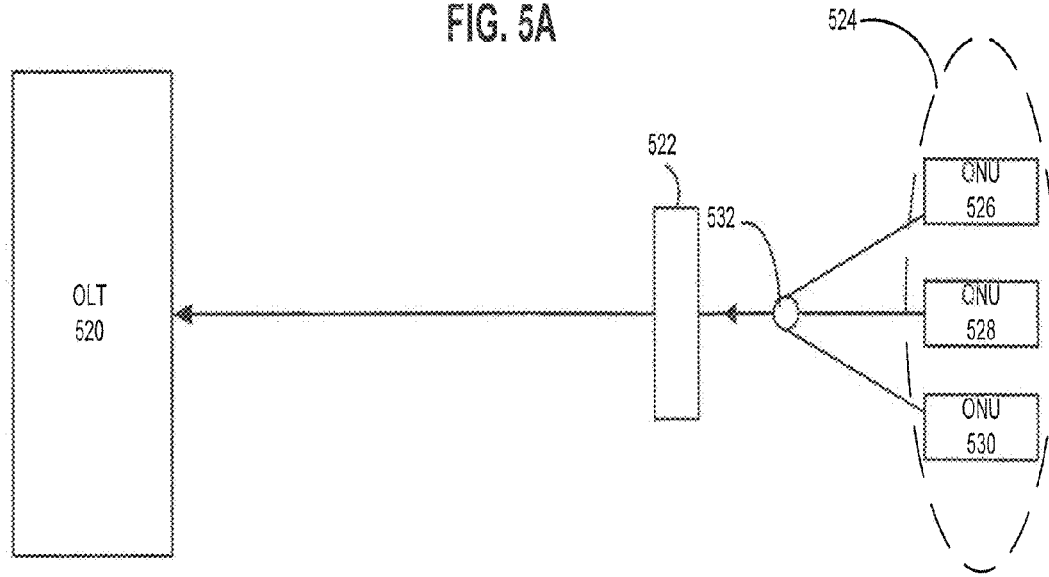

FIG. 5B presents a diagram illustrating an exemplary EPON architecture with burst-to-continuous mode converter installed closer to the ONUs in accordance with an embodiment of the present invention.

Figure 6A:
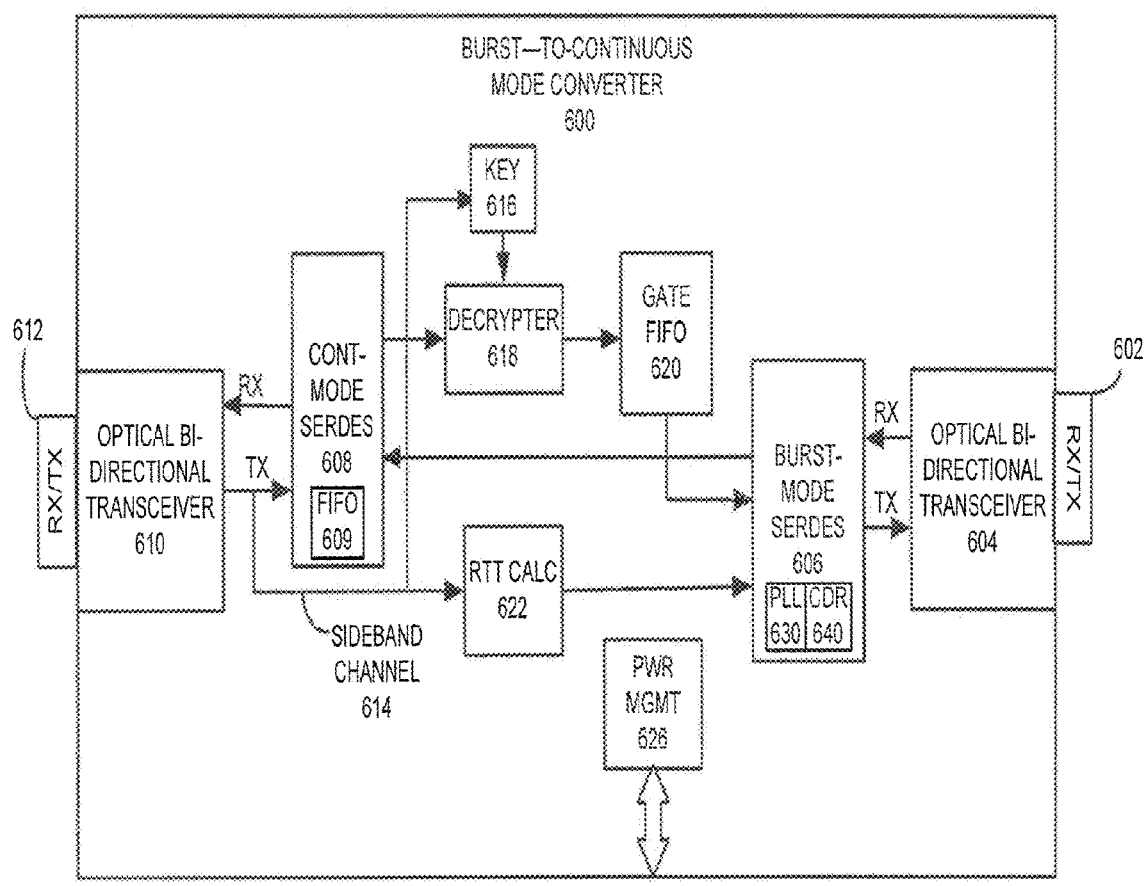

FIG. 6A presents a diagram illustrating an exemplary burst-to-continuous mode converter module located proximate to the GNU in accordance with an embodiment of the present invention.

Figure 6B:
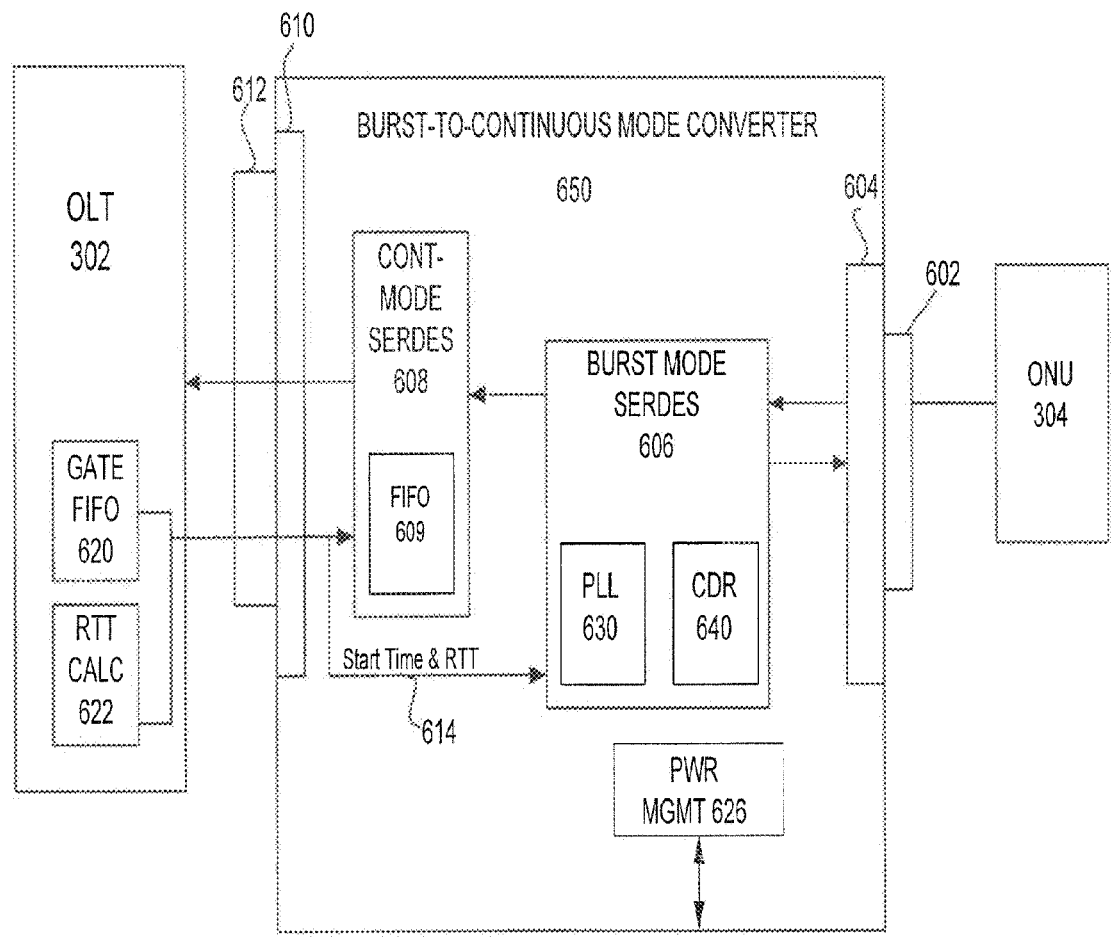

FIG. 6B presents a diagram illustrating an alternate exemplary burst-to-continuous mode converter module located proximate to the GNU in accordance with an embodiment of the present invention.

Figure 7A:
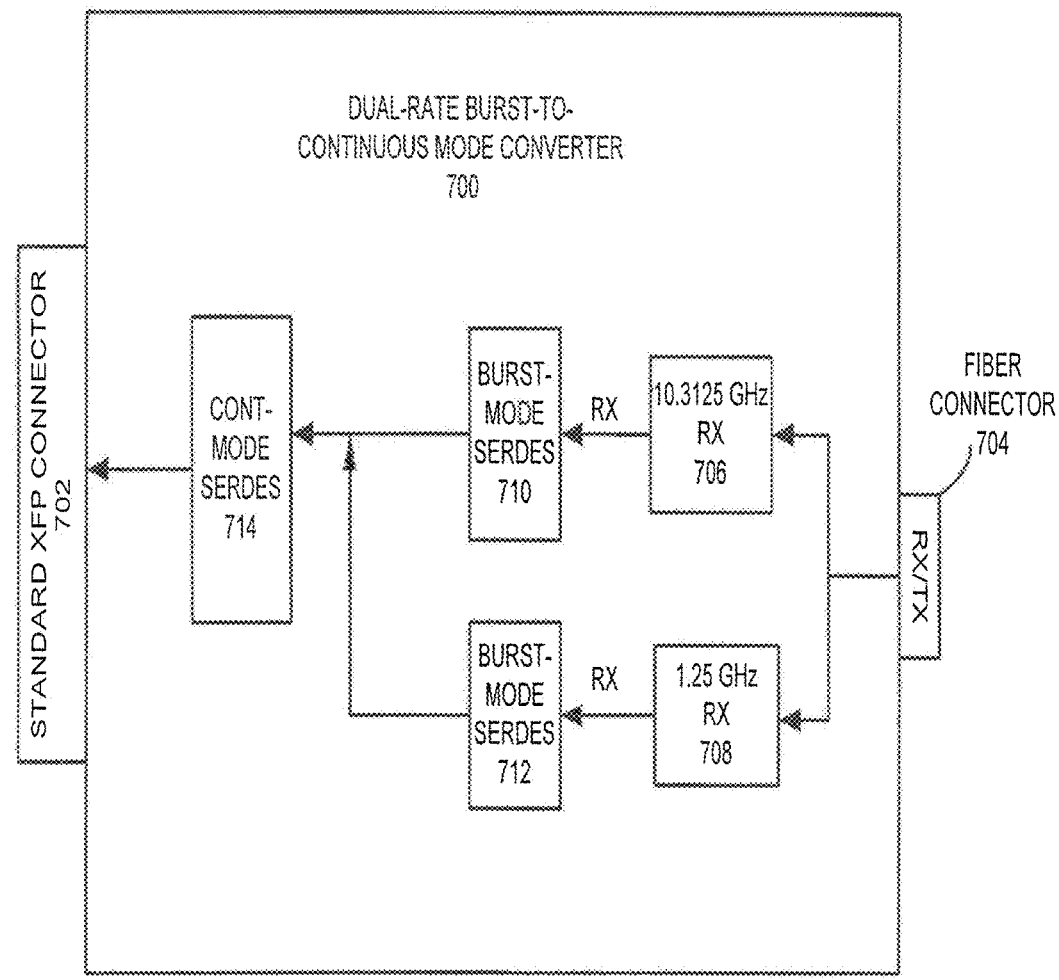

FIG. 7A presents a diagram illustrating the upstream path of a dual-rate burst-to-continuous mode converter in accordance with an embodiment of the present invention.

Figure 7B:
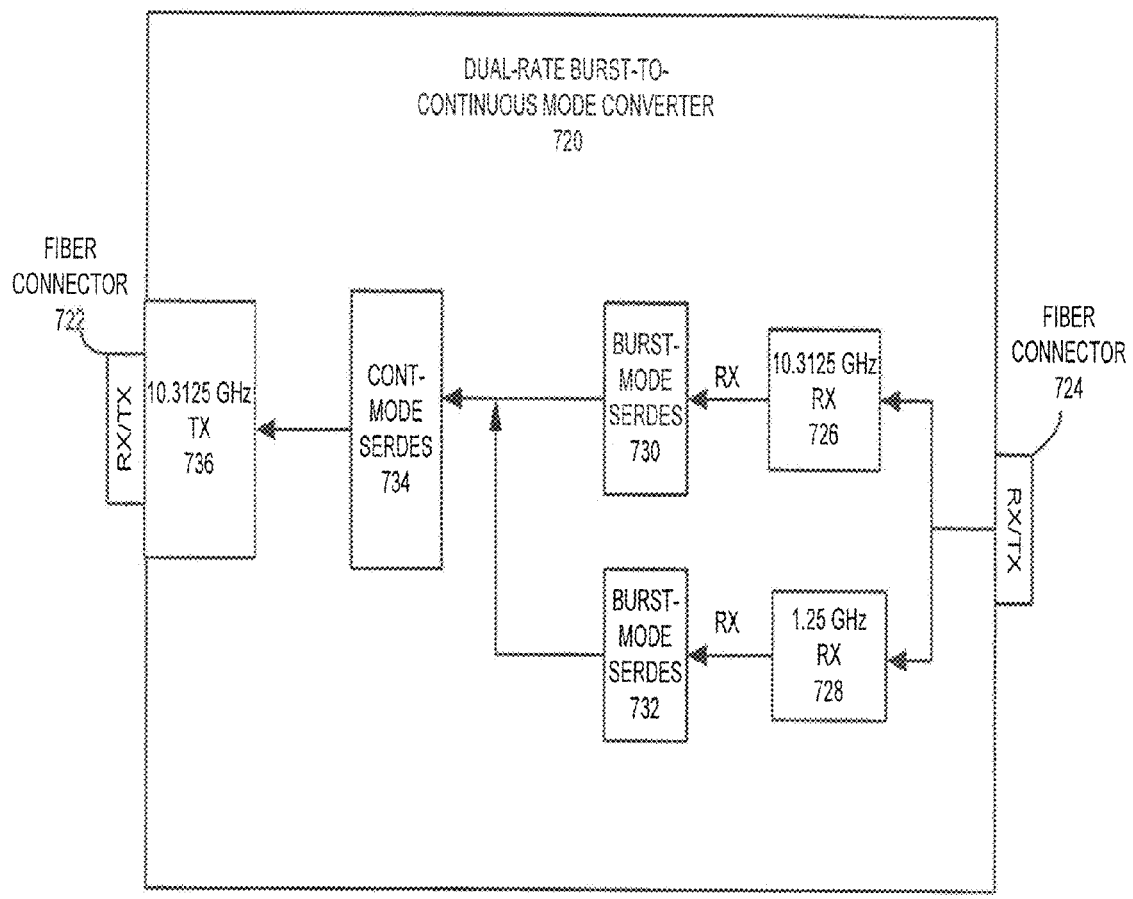

FIG. 7B presents a diagram illustrating the upstream path of a dual-rate burst-to-continuous mode converter closer to an ONU in accordance with an embodiment of the present invention.

Figure 8:
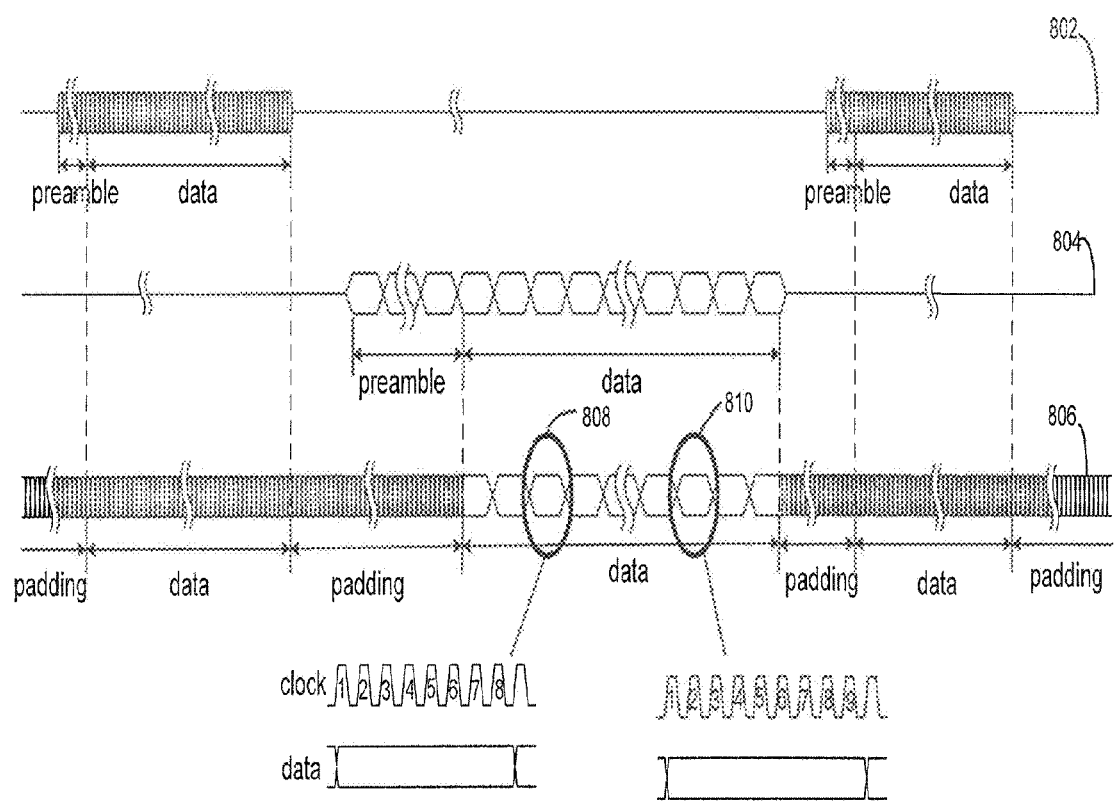

FIG. 8 presents a diagram illustrating exemplary input and output waveforms of a dual-rate burst-to-continuous mode converter in accordance with an embodiment of the present invention.

Figure 9:
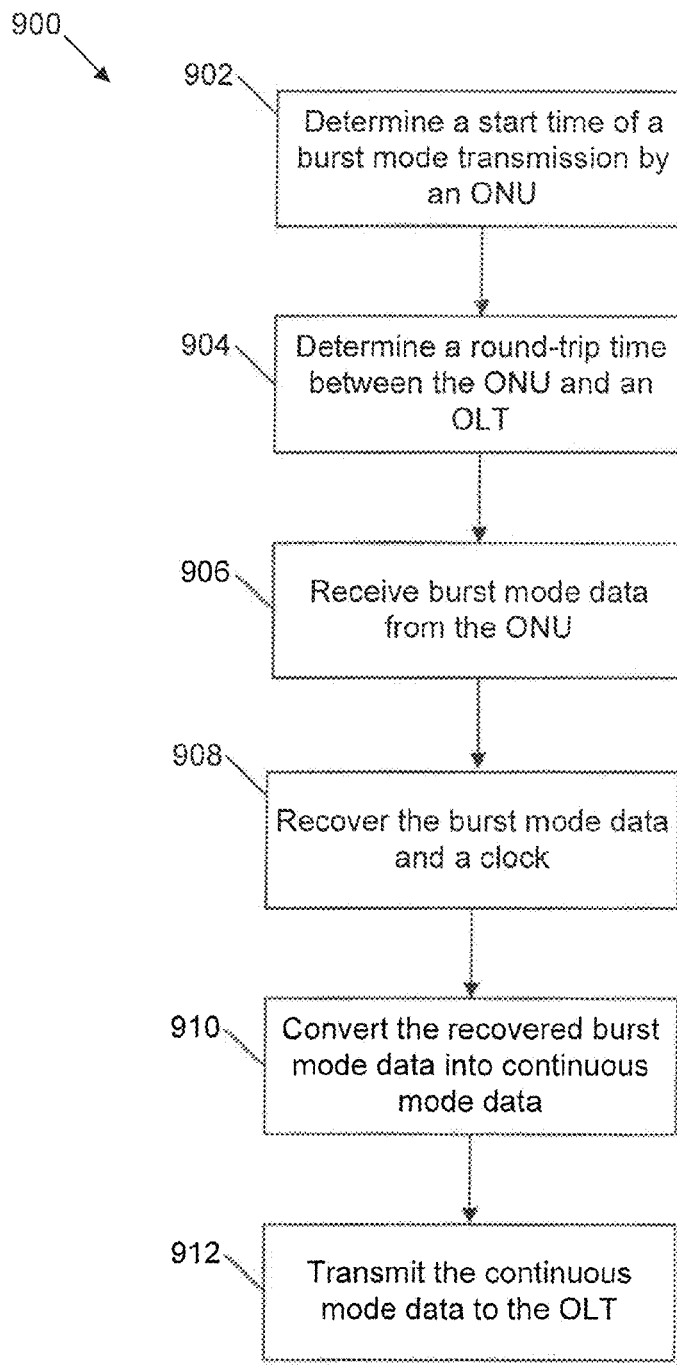

FIG. 9 illustrates an example flowchart illustrating steps performed to convert data from a burst mode to a continuous mode according to an embodiment of the invention The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Embodiments presented herein, or portions thereof, can be implemented in hardware, firmware, software, and/or combinations thereof. The embodiments presented herein apply to any communication system that uses burst and/or continuous mode transmission.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers. Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

FIG. 1 presents a diagram illustrating a passive optical network including a central office and a number of customers coupled through optical fibers and a passive optical splitter (prior art). A passive optical splitter 102 and optical fibers couple the customers to a central office 104. Passive optical splitter 102 can reside near end-user locations to minimize the initial fiber deployment costs. Central office 104 can couple to an external network 106, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs embodiments of the present invention are not limited to EPONs and can be applied to a variety of PONs, such as ATM PONs (APONs) and wavelength division multiplexing (WDM) PONs.

In an EPON, communications can include downstream traffic and upstream traffic. In the following description, "downstream" refers to the direction from an OLT to one or more ONUs, and "upstream" refers to the direction from an ONU to the OLT. in the downstream direction, because of the broadcast nature of the 1×N passive optical coupler, data packets are broadcast by the OLT to all ONUS and are selectively extracted by their destination ONUs. Moreover, each ONU is assigned one or more Logical Link Identifiers (LLIDs), and a data packet transmitted by the OLT typically specifies a LLID of the destination ONU. In the upstream direction, the ONUs need to share channel capacity and resources, because there is only one link coupling the passive optical coupler to the OLT.

Different from the downstream OLT transmission, which can be a continuous data transmission, the upstream ONU transmission is bursty in nature because an ONU may be inactive for long periods of time and only transmits in short bursts. In order to receive the upstream transmission correctly, the OLT needs to be able to extract both data and clock information from received upstream burst traffic. Such a task is often accomplished by a clock and data recovery (CDR) circuit (for example CDR unit 440 in FIGS. 4A-B and CDR unit 640 in FIG. 6A-B), which can be integrated with a Serializer/Deserializer (SerDes) to form a burst mode SerDes. The burst mode SerDes receives electrical signals from a bi-directional optical transceiver, recovers the clock and data (by locking to the electrical burst using preamble bits), and deserializes the data for OLT processing.

However, the use of a burst mode for transmissions to the OLT results in constant charging and discharging of Alternating Current (AC) coupling capacitors at the OLT. The constant charging and discharging may result in time delays in the data stream. Furthermore, it is highly challenging to have a burst mode SerDes operating at high speed, such as 10 GHz as required by a 10 GHz EPON because of the constant charging and discharging of AC coupling capacitors. Currently available burst mode SerDes designs often operate at a speed of 1.25 GHz.

Overview

Embodiments of the present invention presented herein provide a burst-to-continuous mode converter located between an OLT and an ONU for converting a bursty upstream signal from an ONU to a continuous signal that can be fed to an OLT. The burst-to-continuous mode converter includes a burst mode SerDes and a continuous mode SerDes. During operation, the system decrypts downstream GATE messages from the OLT to extract start times for upcoming GNU upstream transmissions. The system then provides those start times to a burst mode SerDes, which in turn uses such information to anticipate the time of arrival of the upstream traffic, and rapidly recover received clock and data. The recovered clock and data are then fed to a continuous mode SerDes, which in turn transmits the data as a continuous bit stream to the OLT. As a result, the OLT only sees continuous signal upstream input, thus making it possible to use standard high-speed continuous-mode components on the OLT for subsequent data processing.

Multi-point Control Protocol

According to the IEEE standard 802.3ah, an EPON entity (such as an OLT or an ONU) implements a multi-point control protocol (MPCP) function within a MAC control sublayer. MPCP is used by an EPON for scheduling of upstream transmissions. During operation, the OLT allocates a transmission window (also called a grant) to each ONU. An ONU defers (often by data buffering) transmission until its grant arrives, at which point the ONU transmits the buffered user data to the OLT within the assigned transmission window.

To request a transmission window, an ONU sends a REPORT message with the ONU's state information, such as its queue information, to the OLT. To grant a transmission window, the OLT sends a GATE message to the ONU indicating a start time and a duration for the ONU transmission. FIG. 2 presents a diagram illustrating the format of a GATE message according to IEEE standard 802.3ah. From FIG. 2, one can see that up to 4 different transmission windows (grants) can be allocated to an ONU within one GATE message. For each grant, the GATE message specifies a start time and a length.

In order for the scheduling to work properly, the OLT discovers and initializes any newly joined ONUs using a discovery process. During discovery, the OLT may collect information critical to transmission scheduling, such as the ONU's round-trip time (RTT), its media access control (MAC) address, its service-level agreement, etc. Note that in some cases the service-level agreement may already be known to the OLT.

FIG. 3 presents a time-space diagram illustrating the discovery process. At the beginning of the discovery process, OLT 302 first sets a start time $t_s$ of a time interval in which OLT 302 enters the discovery mode and allows new ONUs to register (this time interval is called the discovery window). Note that, from the current time until $t_s$, OLT 302 can keep receiving normal upstream data from registered ONUs. OLT 302 also sets a time interval during which each newly joined ONU is allowed to transmit a response message to OLT 302 to request registration (called the discovery slot), wherein the start time of a discovery slot is the same as the start time of the discovery window, $t_s$. Since there might be more than one ONU seeking registration, and since the distance between an unregistered ONU and OLT 302 is unknown, the size of the discovery window should at least include the size of a discovery slot and the maximum allowed round-trip delay between an ONU and OLT 302.

At a time $t_1$ ($t_1 < t_s$), OLT 302 broadcasts a discovery solicitation message 312 (which can be a DISCOVERY_GATE message, in accordance with the IEEE 802.3ah MPCP standard) to all ONUs, including a newly joined unregistered ONU 304. Discovery solicitation message 312 includes a time stamp of $t_1$, which is the time when the message is sent by OLT 302, and a time stamp of $t_s$, which is the start time of the discovery slot. Upon receiving discovery solicitation message 312, ONU 304 sets its local clock to $t_1$ according to the time stamp carried by discovery solicitation message 312.

When ONU 304's local clock reaches $t_s$, the start time of the discovery slot, ONU 304 waits an additional random delay and then transmits a response message 314 (which can be a REGISTER_REQUEST message, in accordance with the IEEE 802.3ah MPCP standard). This random delay is applied to avoid persistent collisions when response messages from multiple uninitialized ONUs consistently collide. Response message 314 contains ONU 304's MAC address and a timestamp of $t_2$, which is ONU 304's local time when response message 314 is sent.

When OLT 302 receives response message 314 from ONU 304 at time $t_3$, it learns ONU 304's MAC address and ONU 304's local time $t_2$ when response message 314 is sent. OLT 302 can then compute the round-trip delay of ONU 304, which is $[(t_3-t_1)-(t_2-t_1)]=(t_3-t_2)$.

Burst-to-continuous Mode Converter

Because the OLT's downstream GATE message contains the start times of an ONU's expected upstream transmissions, embodiments of the present invention utilize such information to facilitate the CDR operation of a burst-mode SerDes. In some embodiments, a burst-to-continuous mode converter located on an OLT is used to convert the bursty upstream ONU transmission to a continuous stream of electrical signals that are fed into the OLT.

To enable flexible equipment upgrading, in some embodiments, the burst-to-continuous mode converter is implemented as a pluggable module that can be directly plugged into an OLT. The connection interface between a pluggable burst-to-continuous mode converter module and the OLT can be based on any standard or proprietary format. In one embodiment, the module complies with the 10 Gigabit Small Form Factor Pluggable (XFP) specification. XFP defines a 10 Gigabit hot-pluggable small-footprint serial-to-serial data-agnostic multi-rate transceiver, intended to support telecom and datacom applications. In some embodiments, the converter module can comply with other module specifications, such as the Small Form-factor Pluggable (SFP) standard and the Gigabit Interface Converter (GBIC) standard. Other form factors could be used and are within the scope of the invention.

FIG. 4A presents a diagram illustrating an exemplary pluggable burst-to-continuous mode converter module 400 with an XFP form factor in accordance with an embodiment of the present invention. An XFP burst-to-continuous mode converter module 400 includes a standard XFP connector 402, which provides serial communication channels with the OLT, and a fiber connector 404 for coupling to an optical fiber on the ONU side, i.e., the EPON fiber. Through fiber connector 404, an optical bi-directional transceiver 406 transmits optical signals to and receives optical signals from the optical fiber. Transceiver 406 is capable of simultaneous transmitting and receiving. That is, transceiver 406 can transmit a downstream signal to and receive an upstream signal from the same fiber. The two signals can be on two wavelengths, and the optical fiber can be a single-mode or multi-mode optical fiber.

Transceiver 406 is further coupled to a burst-mode SerDes 408, through a transmission (TX) link and a receiving (RX) link. During operation, optical transceiver 406 converts a received upstream optical signal (from an ONU) to an electrical signal and sends the electrical signal to SerDes 408 via the RX link. Burst-mode SerDes 408 performs a clock and data recovery operation using, for example, CDR unit 440 and sends the recovered data and clock signals to a continuous-mode SerDes 410.

Continuous-mode SerDes 410 couples to the OLT via XFP connector 402 through a TX link and an RX link. During operation, continuous-mode SerDes 410 receives OLT downstream electrical signals including encrypted GATE messages destined to ONUs. SerDes 410 sends the encrypted GATE messages to a data decrypter 412 for decryption. A key 414 received from the OLT via a serial communication channel 416 is fed to data decrypter 412 for data decrypting. In addition to retrieving decryption keys, serial communication channel 416 is also responsible for sending RTT information to an RTT calculator 418, which in turn calculates the corresponding RTT between the OLT and a particular ONU. In this example, data such as key 414 is transmitted via an in-band channel, such as the serial communication channel 416, since the burst to continuous mode converter 400 is located proximate to the OLT. Data decrypter 412 decrypts downstream GATE messages and extracts the start time of each grant from the GATE messages. In accordance with MPCP specifications, the start time in a grant indicates the beginning of a transmission time window assigned to an ONU. In other words, an ONU is expected to start its upstream transmission at the start time. Note that the start time is in the form of MPCP time, which is recorded as a 32-bit integer that indicates the value of a time-quanta (TQ) counter. The TQ counter increments its value every 16 ns. Since time slots occur in order, the extracted start times from the GATE messages for one or more ONU's are sent to a GATE first-in-first-out (FIFO) queue 420. The start times are then retrieved and sent to burst mode SerDes 408.

Using the start time from a GATE message and the RTT to a corresponding ONU, SerDes 408 is able to calculate an exact time at which it can expected to receive an ONU upstream transmission. In other words, burst-mode SerDes 408 is able to anticipate the exact time at which it receives upstream signals from optical transceiver 406. Such knowledge can be used to facilitate a rapid clock and data recover because the corresponding phase-lock-loop (PLL) 430 is able to make a coarse phase adjustment using the timing information. Additional fine tune of phase shift can be achieved by the PLL. The recovered clock and data are then sent to continuous-mode SerDes 410, which converts the recovered burst mode data into continuous mode data using data buffering and padding techniques. For example, the recovered data can be first sent to a buffering mechanism, such as a first-in-first-out (FIFO) queue 409. After a period of time, the content of the buffer can be read continuously by continuous-mode SerDes 410 using a locally generated clock. To prevent buffer underrun, a predetermined bit sequence, such as all "0s" or all "1s," can be used to fill the buffer space in between data burst. Because continuous-mode SerDes 410 outputs signal in continuous mode, the coupling OLT only sees continuous signal input, thus making it possible to use standard high-speed continuous-mode components on the OLT for subsequent data processing.

Also included in XFP burst-to-continuous mode converter module 400 is a power management module 422, which draws power from XFP connector 402 and provides power for the rest of converter module 400.

In further embodiments, the integrated circuits, such as the SerDes, the optical transceiver, and the power management module, can be directly attached to the underlying printed circuit board (PCB) without individual packaging. That is, an IC die is attached directly to a PCB, and conductive wires are bonded to the IC connects and conductive regions on the PCB. The die is typically covered with a blob of epoxy.

Note that the GBIC, SFP, and XFP are not the only form factors applicable to the inventive pluggable burst-to-continuous mode converter. A pluggable burst-to-continuous mode converter generally can have any form factor. Particularly, the pluggable converter can have a form factor which is substantially similar to any fiber-optical transceiver, such as XENPAK, which conforms to the 10 Gb Ethernet standard as described in IEEE standard 802.3ae.

FIG. 4B illustrates an alternate pluggable burst-to-continuous mode converter module proximate to an OLT in accordance with an embodiment of the present invention. In the embodiment in FIG. 4B, GATE FIFO 420 and RTT calculator 418 are located in OLT 302 instead of in burst-to-continuous mode converter as shown in FIG. 4A. In the present embodiment, since GATE FIFO 420 is within OLT 302, decrypter 412 and key 414 are not required thereby resulting in infrastructural cost savings. In this embodiment, OLT 302 stores the start time of each transmission for an ONU in GATE FIFO 420. OLT 302 also computes the RTT for each ONU 304 using RTT calculator 418 as described above. OLT 302 transmits the start time for transmission and the RTT to burst mode SerDes 408 via serial communication channel 416.

As described above with respect to FIG. 4A, based on the start time and the RTT, SerDes 408 calculates an exact time at which it can be expected to receive an ONU upstream transmission. CDR unit 440 recovers a clock and burst mode data from ONU 304 based on the start time and the RTT. PLL 430 makes coarse phase adjustment to the recovered clock based on the start time and RTT, Additional fine tuning of the phase shift can be achieved by the PLL 430. The recovered clock and data are then sent to continuous-mode SerDes 410, which converts the burst mode data into continuous mode data using data buffering and padding. For example, the recovered data can be first sent to a buffering mechanism, such as a first-in-first-out (FIFO) queue 409. After a period of time, the content of FIFO 409 can be read continuously by continuous-mode SerDes 410 using a locally generated clock. To prevent buffer underrun, a predetermined hit sequence, such as all "0s" or all "1s," can be used to fill the buffer space in between data burst. Because continuous-mode SerDes 410 outputs signal in continuous mode, the Alternating Current (AC) coupling capacitors at OLT 302 only see a continuous signal input, thus making it possible to use standard high-speed continuous-mode components on the OLT for subsequent data processing.

Also included in XFP burst-to-continuous mode converter module 400 is a power management module 422, which draws power from XFP connector 402 and provides power for the rest of converter module 400.

Instead of having the burst-to-continuous mode converter plugged into the OLT, in some embodiments, the mode converter can be installed at a place closer to the ONUs. This is possible if there is a power source available closer to the ONUs to power the burst-to-continuous mode converter. FIGS. 5A-B demonstrates these two different configurations. FIG. 5A presents a diagram illustrating an exemplary EPON architecture with a burst-to-continuous mode converter plugged into the OLT in accordance with an embodiment of the present invention. In FIG. 5A, an XFP burst-to-continuous mode converter module 502 is plugged into an OLT 500. XFP burst-to-continuous mode converter module 502 couples to a PON 504, which includes a number of ONUs, such as ONUs 506-510, via a passive optical splitter 512. XFP burst-to-continuous mode converter 502 receives upstream ONU transmissions, converts the received bursty optical signals to continuous electrical signals, and feeds the continuous electrical signals to OLT 500 for further processing.

FIG. 5B presents a diagram illustrating an exemplary EPON architecture with burst-to-continuous mode converter installed closer to the ONUs in accordance with an embodiment of the present invention. In FIG. 513, a burst-to-continuous mode converter 522 is installed at a place closer to a PON 524, which includes a number of ONUs, such as ONUs 526-530. Note that as shown in FIG. 5B, burst-to-continuous mode converter 522 is located between passive optical splitter 532, which is responsible for splitting the downstream EPON signals and combining the upstream EPON signals, and OLT 520. In some embodiments, converter 522 can be installed in the same physical enclosure that contains passive optical splitter 532. Also note that instead of plugging directly into OLT 520 via an electrical interface, converter 522 is coupled to OLT 520 via an optical fiber (i.e., the EPON fiber), thus needing additional electrical-optical (E/O) conversion.

FIG. 6A presents a diagram illustrating an exemplary burst-to-continuous mode converter module located proximate to or closer to the ONU side in accordance with an embodiment of the present invention. Burst-continuous mode converter module 600 includes a fiber connector 602 for coupling to an optical fiber on the ONU side via a passive optical splitter and a fiber connector 612 for coupling to an optical fiber on the OLT side. Through fiber connector 602, an optical bi-directional transceiver 604 transmits optical signals to and receives optical signals from the optical fiber to the ONU side. Transceiver 604 is capable of simultaneous transmitting and receiving. That is, transceiver 604 can transmit a downstream signal to and receive an upstream signal from the same optical fiber. The two signals can be on two wavelengths, and the optical fiber can be a single-mode or multi-mode optical fiber.

Transceiver 604 is further coupled to a burst-mode SerDes 606, through a transmission (TX) link and a receiving (RX) link. During operation, optical transceiver 604 converts a received upstream optical signal (from the ONU) to an electrical signal and sends the electrical signal to SerDes 606 via the RX link. Burst-mode SerDes 606 performs a clock and data recovery operation using, for example, clock and data recover (CDR) unit 640 and sends the recovered data and clock signals to a continuous-mode SerDes 608.

Through fiber connector 612, an optical bi-directional transceiver 610 transmits optical signals to and receives signals from the optical fiber to the OLT side. Transceiver 610 is also capable of simultaneous transmitting and receiving. That is, transceiver 610 can transmit an upstream signal to and receive a downstream signal from the same optical fiber. Similarly, the two signals can be on two different wavelengths, and the optical fiber can be a single-mode or multi-mode optical fiber. During operation, transceiver 610 receives downstream OLT signals, converts received optical signals to electrical signals, and sends converted electrical signals, which include encrypted GATE messages destined to ONUs, to continuous-mode SerDes 608. SerDes 608 sends the encrypted GATE message to a data decrypter 618 for decryption. Note that in order to decrypt the GATE message, a key 616 is received via a separate sideband channel 614 and is fed to data decrypter 618. The separate sideband channel 614 is needed because burst to continuous mode module 600 is not proximate to the OLT. In addition to retrieving decryption keys, sideband channel 614 is also responsible for sending RTT information to an RTT calculator 622, which in turn calculates the RTT between the OLT and a particular ONU. Data decrypter 618 decrypts a downstream GATE message and extracts the start time of each grant from the GATE message. The extracted start times from the GATE message are first sent to a GATE first-in-first-out (FIFO) queue 620 and are then sent to burst mode SerDes 606.

Using the start times from a GATE message and the RTT to a corresponding ONU, burst-mode SerDes 606 is able to calculate an exact time at which it receives an ONU upstream transmission. In other words, burst-mode SerDes 606 is able to anticipate a time when it receives upstream signals from optical transceiver 604. The timing information can be used to facilitate a fast clock and data recover operation. Also, phase-lock-loop (PLL) 630 makes a coarse phase adjustment using the timing information. Additional fine tune of phase shift can be achieved by the PLL 630 as well. The recovered clock and data are then sent to continuous-mode SerDes 608, which converts the bursty signal into a continuous signal through data buffering in FIFO 609 and padding as described above with reference to FIG. 4.

Also included in burst-to-continuous mode converter 600 is a power management module 626, which receives external power and provides power for the rest of converter module 600. In this example, since burst-to-continuous mode converter 600 is not located proximate to the OLT, it cannot use a XFP connector, such as XFP connector 402 as a power source.

Note that installing burst-to-continuous mode converter 600 closer to the ONUs can facilitate the regeneration of downstream and upstream EPON signals, thereby effectively extending the range of the EPON.

FIG. 6B illustrates an alternate pluggable burst-to-continuous mode converter module proximate to an ONU in accordance with an embodiment of the present invention. In the embodiment in FIG. 6B, GATE FIFO 620 and RTT calculator 622 are located in OLT 302 instead of in burst-to-continuous mode converter as shown in FIG. 6A. In the present embodiment, since GATE FIFO 620 is within OLT 302, decrypter 618 and key 616 are not required thereby resulting in infrastructural cost savings. In this embodiment, OLT 302 stores the start time of each transmission for an ONU in GATE FIFO 620. OLT 302 also computes the RTT for each ONU 304 using RTT calculator 622 as described above. OLT 302 transmits the start time for transmission and the RTT to burst mode SerDes 606 via sideband channel 614.

As described above, using the start times stored in GATE FIFO 620 and the RTT to a corresponding ONU, burst-mode SerDes 606 is able to calculate an exact time at which it receives an ONU upstream transmission. In other words, burst-mode SerDes 606 is able to anticipate a time when it receives upstream signals from optical transceiver 604. The timing information can be used to facilitate a fast clock and data recovery operation. Also, phase-lock-loop (PLL) 630 makes a coarse phase adjustment to the recovered clock using the timing information. Additional fine tuning of the phase shift can be achieved by the PLL 630 as well. The recovered clock and recovered burst mode data are then sent to continuous-mode SerDes 608, which converts the recovered burst mode data into continuous mode data through data buffering in FIFO 609 and padding as described above with reference to FIG. 4A.

Dual rate Burst-to-Continuous Mode Converter

The inventive burst-to-continuous mode converter can work in both a symmetric (e.g., 10 GHz downstream transmission and 10 GHz upstream transmission) EPON configuration and or asymmetric (e.g., 10 GHz downstream transmission and 1.25 GHz upstream transmission) EPON configuration. In other words, the burst-to-continuous mode converter can work both at a speed of 10 GHz and at a speed of 1.25 GHz. In order to work at the dual rates, the burst-to-continuous mode converter is capable of up-converting received 1.25 GHz upstream EPON signals to a 10 GHz transmission using buffering and transmitting techniques. During operation, the received 1.25 GHz ONU upstream packets are buffered in a packet FIFO queue located inside the burst-to-continuous mode converter before being transmitted at a 10 GHz speed to the upstream OLT. To maintain a consistent latency, the packet FIFO queue can provide a fixed amount of delay for each packet. FIG. 7A presents a diagram illustrating the upstream path of a dual-rate burst-to-continuous mode converter in accordance with an embodiment of the present invention. Dual-rate burst-to-continuous mode converter 700 includes a XFP connector 702, a fiber connector 704, a high-speed optical receiver 706, a low-speed optical receiver 708, a burst-mode SERDES 710 coupled to high-speed optical receiver 706, a burst-mode SERDES 712 coupled to low-speed optical receiver 708, and a continuous mode SERDES 714.

During operation, high-speed receiver 706 receives high-speed upstream transmission from downstream ONUs via fiber connector 704. In one embodiment, high-speed receiver 706 receives optical signal at a rate of 10.3125 GHz. Similarly, low-speed receiver 708 receives low-speed upstream transmission from downstream ONUs via fiber connector 704. In one embodiment, low-speed receiver 708 receives optical signal at a rate of 1.25 GHz. In a further embodiment, a time-division multiplexing (TDM) technique is used for combining the high-speed and low-speed optical signals on the same optical fiber.

The outputs of receivers 706 and 708 are sent to burst-mode SERDESes 710 and 712, respectively. Note that the operation of burst mode SERDESes 710 and 712 are similar to the ones shown in FIGS. 4A-B and FIGS. 6A-B. To convert the burst-mode signal to continuous output, appropriate buffering and padding techniques can be used. The output of continuous-mode SERDES 712 is sent to an OLT via XFP connector 702.

In one embodiment, dual-rate burst-to-continuous mode converter is located closer to the ONU, and an optical fiber is used to couple the mode converter with an OLT. In such case, the output of continuous-mode SERDES 712 is sent to an optical transmitter, which communicates with an OLT via a fiber connector. FIG. 7B presents a diagram illustrating the upstream path of a dual-rate burst-to-continuous mode converter closer to an ONU in accordance with an embodiment of the present invention. In FIG. 7B, dual-rate burst-to-continuous mode converter 720 includes fiber connectors 722 and 724, a high-speed optical receiver 726, a low-speed optical receiver 728, a burst-mode SERDES 730 coupled to high-speed optical receiver 726, a burst-mode SERDES 732 coupled to low-speed optical receiver 728, a continuous mode SERDES 734, and a high-speed optical transmitter 736.

During operation, the outputs of receivers 726 and 728 are sent to burst-mode SERDESes 730 and 732, respectively. The output of burst-mode SERDESes 730 and 732 are sent to continuous-mode SERDES 734 and the output of continuous-mode SERDES 734 is used to drive high-speed optical transmitter 736. In one embodiment, transmitter 736 operated at a speed of 10.3125 GHz, High-speed transmitter 736 communicates with a remote OLT via fiber connector 722.

Note that continuous-mode SERDES sends data to the OLT, either via an SEP connector or a fiber connector, using the higher data rate. To do so, multiple high-speed data bits are used to represent a single low-speed data bit, For example, a bit "1" in the 1.25 GHz data stream can be represented by 8 or 9 continuous "1"s in a 10.3125 GHz data stream by replicating the bit "1".

FIG. 8 presents a diagram illustrating exemplary input and output waveforms of a dual-rate burst-to-continuous mode converter in accordance with an embodiment of the present invention. Data streams 802 and 804 represent burst-mode upstream transmissions of 10.3125 GHz and 1.25 GHz, respectively. Note that these two data burst do not overlap in the time domain, Also note that each data burst includes a number of preamble bits that can be used for clock recovery. Data steam 806 represents the continuous output of a dual-rate burst-to-continuous-mode converter operating at 10.3125 GHz, In the example shown in FIG. 8, the preambles are omitted in the continuous-mode output since the continuous data stream itself is sufficient for clock recovery. In addition, padding bits are inserted in between the data bursts to ensure the output continuity. To transmit the 1.25 GHz data stream at a rate of 10.3125 GHz, each data bit in the 1.25 GHz stream (data stream 804) is transmitted eight or nine times in data stream 806, which is the output of a 10.3125 GHz transmitter. FIG. 8 illustrates the amplified view of a bit group 808 corresponding to a single 1.25 GHz bit. As one can see, bit group 808 includes a same bit that last for eight clock cycles. To match the bit rate between 10.3125 GHz and 1.25 GHz, in one embodiment, every so often, the system transmits a 1.25 GHz bit nine times using the 10.3125 GHz transmitter, FIG. 8 also illustrates the amplified view of a bit group 810 corresponding to a single 1.25 GHz bit. Bit group 810 includes a same bit that lasts for nine clock cycles. In one embodiment, after transmitting every three 1.25 GHz bits, the system transmits the next 1.25 GHz bit nine times using the 10.3125 GHz transmitter.

FIG. 9 illustrates an example flowchart 900 illustrating steps performed to convert data from a burst mode to a continuous mode according to an embodiment of the invention. Flowchart 900 will be described with continued reference to the example operating environment depicted in FIGS. 1-8. However, the flowchart is not limited to these embodiments. Note that some steps shown in flowchart 900 do not necessarily have to occur in the order shown. The steps in flowchart 800 may be performed, in part or in whole by, for example, burst-to-continuous mode converter 400, 450, 600, 650, 700 and 720.

In step 902, a start time of a burst mode transmission by an ONU. For example, decrypter 412 decrypts a downstream GATE message to an ONU based on key 414 to determine the start time of the burst mode transmission by the ONU.

In step 904, a round-trip time between the ONU and the OLT is determined. For example, RTT calculator 418 determines the round-trip time between the GNU and the OLT.

In step 906, burst mode data is received from the ONU. For example, burst mode data is received from the ONU 304.

In step 908, the burst mode data and a clock are recovered. For example, burst mode SerDes 408 recovers a clock and the burst mode data using PLL 430 and CDR 440.

In step 910, the burst mode data is converted into continuous mode data. For example, continuous mode SerDes 410 converts the recovered burst mode data into continuous mode data using, for example, FIFO 409.

In step 912, the continuous mode data is transmitted to the OLT. For example, the continuous mode data is transmitted by continuous mode SerDes 410 to OLT 302.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The representative functions described herein (e.g. functions performed by decrypter 412, decrypter 618. RTT calculator 418 and RTT calculator 622 can be implemented in hardware, software, or some combination thereof. For instance, these functions can be implemented using computer processors, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor. The computer program instructions cause the processor to perform the functions described herein. The computer program instructions (e.g. software) can be stored in a computer usable medium, computer program medium, or any storage medium that can be accessed by a computer or processor. Such media include a memory device, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for converting data in a passive optical network (PON), comprising:
    a first Serializer/Deserializer (SerDes) configured to recover a clock and the data from an Optical Network Unit (ONU); and
    a second SerDes, coupled to the first SerDes, configured to receive the recovered clock and the recovered data from the first SerDes and to buffer and to pad the recovered data in accordance with the recovered clock to convert the recovered data from a first data format to a second data format.

2. The system of claim 1, further comprising:
    a decrypter, coupled to the second SerDes, an Optical Line Terminal (OLT), and the first SerDes, configured to receive an encrypted message from the second SerDes and a key from the OLT, to decrypt the encrypted message using the key to determine a start time of a data transmission by the ONU, and to transmit the start time to the first SerDes.

3. The system of claim 2, wherein the decrypter is configured to receive the key from the OLT via a serial communication channel when the system is proximate to the OLT, and
    wherein the decrypter is configured to receive the key from the OLT via a sideband channel when the system is proximate to the ONU.

4. The system of claim 1, further comprising:
    a round-trip time (RTT) calculator, coupled to the second SerDes, an Optical Line Terminal (OLT), and the first SerDes, configured to compute a difference between a time of receipt of a register_receipt message by the OLT and a local time at the ONU that is in the register_receipt message to determine a round-trip time between the ONU and the OLT and to provide the round-trip time to the first SerDes.

5. The system of claim 4, wherein the RTT calculator is configured to receive the time of receipt of the register_receipt message by the OLT and the local time at the ONU from the OLT via a serial communication channel when the system is proximate to the OLT, and
    wherein the RTT calculator is configured to receive the time of receipt of the register_receipt message by the OLT and the local time at the ONU from the OLT via a sideband channel when the system is proximate to the ONU.

6. The system of claim 1, wherein the first SerDes includes:
    a phase lock loop (PLL) configured to adjust a phase of the recovered clock that is used to recover the data and to generate a phase-adjusted clock; and
    a clock and data recovery (CDR) unit, coupled to the PLL, configured to recover the data based on the phase-adjusted clock.

7. The system of claim 1, wherein the second SerDes includes a First in First Out (FIFO) queue that is configured to buffer the recovered data, and
    wherein a predetermined bit sequence is stored in the FIFO queue between bursts of the recovered data.

8. The system of claim 1, further comprising:
    a power management unit configured to power the system using energy from a 10 Gigabit Small Form Factor Pluggable (XFP) connector when the system is proximate to an Optical Line Terminal (OLT).

9. The system of claim 1, wherein the system is coupled to an Optical Line Terminal (OLT) using a standard Small Form Factor Pluggable (XFP) connector when the system is proximate to the OLT, and
    wherein the system is coupled to the OLT using a fiber connector when the system is proximate to the ONU.

10. A method for converting data in a passive optical network (PON), comprising:
    receiving the data from an Optical Network Unit (ONU);
    recovering a clock and the data using a first Serializer/Deserializer (SerDes);
    receiving the recovered clock and the recovered data from the first SerDes;
    buffering and padding the recovered data in accordance with the recovered clock to convert the recovered data from a first data format to a second data format using a second SerDes; and
    transmitting the converted data to an Optical Line Terminal (OLT).

11. The method of claim 10, further comprising:
    receiving an encrypted message from the second SerDes;
    receiving a key from the OLT;
    decrypting the encrypted message using the key to determine a start time of a data transmission by the ONU; and
    transmitting the start time to the first SerDes.

12. The method of claim 10, further comprising:
    computing a difference between a time of receipt of a register_receipt message by the OLT and a local time at the ONU that is in the register_receipt message; and
    providing a round-trip time between the ONU and the OLT to the first SerDes based upon the difference.

13. The method of claim 10, wherein recovering comprises:
    adjusting a phase of the recovered clock that is used to recover the data; and
    recovering the data based on the phase-adjusted clock.

14. The method of claim 10, wherein converting comprises:
    storing a predetermined bit sequence between bursts of the recovered data.

15. A dual rate system for converting data in a passive optical network (PON), comprising:

a first Serializer/Deserializer (SerDes) configured to receive first burst mode data at a first data rate from a first Optical Network Unit (ONU) and to recover a first clock and the first burst mode data;

a second SerDes configured to receive second burst mode data from a second ONU at a second data rate and to recover a second clock and second burst mode data from the second ONU; and a third SerDes, coupled to the first SerDes and the second SerDes, configured to receive the first and second recovered clocks and the first and second recovered burst mode data, to convert the first recovered burst mode data and the second recovered burst mode data into continuous mode data by data buffering and data padding, and to transmit the continuous mode data to an Optical Line Terminal (OLT) at the second data rate, wherein the second data rate is higher than the first data rate.

16. The dual rate system of claim 15, wherein the third SerDes is configured to pad and to buffer the first recovered burst mode data to increase a data rate of the first recovered burst mode data to the second data rate.

17. The dual rate system of claim 15, wherein the third SerDes is configured to convert a data rate from a low data rate to a high data rate by replicating bits of a data stream that has a low data rate.

18. The dual rate system of claim 15, wherein the dual rate system is coupled to the OLT using a 10 Gigabit Small Form Factor Pluggable (XFP) connector when the dual rate system is proximate to the OLT, and wherein the dual rate system is coupled to the OLT using a fiber connector when the dual rate system is proximate to the first ONU or the second ONU.

19. The dual rate system of claim 15, wherein the first SerDes is configured to recover the first clock and the first burst mode data based on a transmission start time of the first ONU and a round-trip time between the first ONU and the OLT.

20. The dual rate system of claim 15, wherein the second SerDes is configured to recover the second clock and the second burst mode data from the second ONU based on a transmission start time of the second ONU and a round-trip time between the second ONU and the OLT.

* * * * *